US011317054B2

(12) United States Patent
Wang et al.

(10) Patent No.: US 11,317,054 B2
(45) Date of Patent: Apr. 26, 2022

(54) VIDEO PROCESSING METHOD, VIDEO PROCESSING CONTROL APPARATUS AND DISPLAY CONTROL APPARATUS AND DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yakun Wang, Beijing (CN); Lin Lin, Beijing (CN); Jian Sun, Beijing (CN); Jiyang Shao, Beijing (CN); Ziqiang Guo, Beijing (CN); Feng Zi, Beijing (CN); Binhua Sun, Beijing (CN); Bingxin Liu, Beijing (CN); Yadong Ding, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/973,299

(22) PCT Filed: Dec. 23, 2019

(86) PCT No.: PCT/CN2019/127423
§ 371 (c)(1),
(2) Date: Dec. 8, 2020

(87) PCT Pub. No.: WO2020/140784
PCT Pub. Date: Jul. 9, 2020

(65) Prior Publication Data
US 2021/0250544 A1 Aug. 12, 2021

(30) Foreign Application Priority Data

Jan. 2, 2019 (CN) .......................... 201910002289.3

(51) Int. Cl.
H04N 7/01 (2006.01)
(52) U.S. Cl.
CPC ................................. H04N 7/0127 (2013.01)
(58) Field of Classification Search
CPC ...... G06F 1/1694; G06F 3/0484; G06F 3/011; H04N 7/0127; H04N 13/139;
(Continued)

(56) References Cited

U.S. PATENT DOCUMENTS 8,102,468 B2    1/2012  Inoue et al.
10,198,842 B2 *  2/2019  Korzunov ............ G06K 9/6202
(Continued)

FOREIGN PATENT DOCUMENTS

CN    102665061    9/2012
CN    106598252    4/2017
(Continued)

OTHER PUBLICATIONS

PCT International Search Report (w/English translation) for corresponding PCT Application No. PCT/CN2019/127423, dated Mar. 24, 2020, 5 pages.
(Continued)

Primary Examiner — Paulos M Natnael
(74) Attorney, Agent, or Firm — Dority & Manning, P.A.

(57) ABSTRACT

A video processing method includes: receiving motion information of a display apparatus; determining, according to the motion information of the display apparatus and a motion threshold of the display apparatus, whether a motion state of the display apparatus affects the effect of the display apparatus using a frame rate up-conversion image processing
(Continued)

method based on motion compensation to process a video that is to be displayed by the display apparatus; if yes, stopping using the frame rate up-conversion image processing method based on motion compensation to process the video that is to be displayed by the display apparatus; if no, continuing to use the frame rate up-conversion image processing method based on motion compensation to process the video that is to be displayed by the display apparatus.

16 Claims, 9 Drawing Sheets

(58) Field of Classification Search
CPC .............. H04N 13/167; H04N 7/014; G09G 2340/0435; G02B 27/017
See application file for complete search history.

(56) References Cited

U.S. PATENT DOCUMENTS

| | | | |
|---|---|---|---|
| 2010/0045872 A1* | 2/2010 | Terajima | G09G 5/39 348/705 |
| 2011/0141369 A1* | 6/2011 | Shao | H04N 7/014 348/607 |
| 2013/0137929 A1* | 5/2013 | Morita | H04N 5/23216 600/167 |
| 2017/0024025 A1* | 1/2017 | Choi | G06F 1/3265 |
| 2017/0163958 A1 | 6/2017 | Hu | |
| 2018/0294012 A1* | 10/2018 | Cai | G11B 20/10527 |
| 2018/0307819 A1 | 10/2018 | Yuan et al. | |
| 2020/0099900 A1* | 3/2020 | Su | H04N 9/3179 |

FOREIGN PATENT DOCUMENTS

| | | |
|---|---|---|
| CN | 108810649 | 11/2018 |
| CN | 109725729 | 5/2019 |

OTHER PUBLICATIONS

Chinese First Office Action (w/English translation) for corresponding CN Application No. 201910002289.3, 23 pages.
Chinese Second Office Action (w/ English translation) for corresponding CN Application No. 201910002289.3, 20 pages.
Chinese Third Office Action (w/ English translation) for corresponding CN Application No. 201910002289.3, 23 pages.
Chinese Notification to Grant Patent Right for Invention (w/ English translation) for corresponding CN Application No. 201910002289.3, 7 pages.

* cited by examiner

VIDEO PROCESSING METHOD, VIDEO PROCESSING CONTROL APPARATUS AND DISPLAY CONTROL APPARATUS AND DISPLAY APPARATUS

CROSS-REFERENCE TO RELATED APPLICATIONS

This application is a national phase entry under 35 USC 371 of International Patent Application No. PCT/CN2019/127423 filed on Dec. 23, 2019, which claims priority to Chinese Patent Application No. 201910002289.3, filed on Jan. 2, 2019, which are incorporated herein by reference in their entirety.

TECHNICAL FIELD

The present disclosure relates to the field of display technologies, and in particular, to a video processing method, a video processing control apparatus, a display control apparatus and a display apparatus.

BACKGROUND

A virtual reality (VR) system is a computer simulation system that can create and experience a virtual world. In the application of the VR system, image delay affects quality of displayed images. For example, for moving images (videos), a blur phenomenon may occur.

SUMMARY

In one aspect, a video processing method is provided. The method includes: receiving motion information of a display apparatus; determining, according to the motion information of the display apparatus and a motion threshold of the display apparatus, whether a motion state of the display apparatus affects an effect of the display apparatus using a frame rate up-conversion image processing method based on motion compensation to process a video that is to be displayed by the display apparatus; if yes, stopping using the frame rate up-conversion image processing method based on motion compensation to process the video that is to be displayed by the display apparatus; if no, continuing to use the frame rate up-conversion image processing method based on motion compensation to process the video that is to be displayed by the display apparatus.

In some embodiments, the motion information of the display apparatus includes an X-axis acceleration Accel_X, a Y-axis acceleration Accel_Y and a Z-axis acceleration Accel_Z of the display apparatus in a three-dimensional coordinate system, and the motion threshold includes an acceleration threshold Accel_Threshold;

determining, according to the motion information of the display apparatus and the motion threshold of the display apparatus, whether the motion state of the display apparatus affects the effect of the display apparatus using the frame rate up-conversion image processing method based on motion compensation to process the video that is to be displayed by the display apparatus, includes:

determining whether the motion information and the motion threshold of the display apparatus meet:

$$\mathrm{Sqrt}(Accel\_X^2 + Accel\_Y^2 + Accel\_Z^2) \geq Accel\_Threshold;$$

if yes, determining that the motion state of the display apparatus affects the effect of the display apparatus using the frame rate up-conversion image processing method based on motion compensation to process the video that is to be displayed by the display apparatus; and if no, determining that the motion state of the display apparatus does not affect the effect of the display apparatus using the frame rate up-conversion image processing method based on motion compensation to process the video that is to be displayed by the display apparatus.

In some embodiments, receiving the motion information of the display apparatus includes: receiving m pieces of motion information of the display apparatus one by one within a first preset time period, wherein m is an integer greater or equal to 2; and determining, according to the motion information of the display apparatus and the motion threshold of the display apparatus, whether the motion state of the display apparatus affects the effect of the display apparatus using the frame rate up-conversion image processing method based on motion compensation to process the video that is to be displayed by the display apparatus, includes:

determining one by one, according to respective pieces of motion information in the m pieces of motion information and the motion threshold of the display apparatus, whether respective motion states in m motion states of the display apparatus affect the effect of the display apparatus using the frame rate up-conversion image processing method based on motion compensation to process the video that is to be displayed by the display apparatus; if it is determined that the m motion states of the display apparatus all affect the effect of the display apparatus using the frame rate up-conversion image processing method based on motion compensation to process the video that is to be displayed by the display apparatus, determining that the motion state of the display apparatus affects the effect of the display apparatus using the frame rate up-conversion image processing method based on motion compensation to process the video that is to be displayed by the display apparatus; and if it is determined that the m motion states of the display apparatus do not all affect the effect of the display apparatus using the frame rate up-conversion image processing method based on motion compensation to process the video that is to be displayed by the display apparatus, determining that the motion state of the display apparatus does not affect the effect of the display apparatus using the frame rate up-conversion image processing method based on motion compensation to process the video that is to be displayed by the display apparatus.

In some embodiments, before determining, according to the motion information of the display apparatus and the motion threshold of the display apparatus, whether the motion state of the display apparatus affects the effect of the display apparatus using the frame rate up-conversion image processing method based on motion compensation to process the video that is to be displayed by the display apparatus, the video processing method further includes:

receiving the video that is to be displayed by the display apparatus, the video including data of multiple frames; determining whether data of consecutive k frames in the data of the multiple frames are the same, wherein k is an integer greater than or equal to 2; if yes, stopping using the frame rate up-conversion image processing method based on motion compensation to process the video that is to be displayed by the display apparatus; and if no, determining, according to the motion information of the display apparatus and the motion threshold of the display apparatus, whether the motion state of the display apparatus affects the effect of the display apparatus using the frame rate up-conversion image processing method based on motion compensation to process the video that is to be displayed by the display apparatus.

In some embodiments, if the data of the consecutive k frames are not the same, before determining, according to the motion information of the display apparatus and the motion threshold of the display apparatus, whether the motion state of the display apparatus affects the effect of the display apparatus using the frame rate up-conversion image processing method based on motion compensation to process the video that is to be displayed by the display apparatus, the video processing method further includes:

determining, according to the motion information of the display apparatus and a static threshold of the display apparatus, whether the display apparatus is still or approximately still; if yes, stopping using the frame rate up-conversion image processing method based on motion compensation to process the video that is to be displayed by the display apparatus; and if no, determining, according to the motion information of the display apparatus and the motion threshold of the display apparatus, whether the motion state of the display apparatus affects the effect of the display apparatus using the frame rate up-conversion image processing method based on motion compensation to process the video that is to be displayed by the display apparatus.

In some embodiments, the motion information of the display apparatus includes an X-axis angular velocity Gyro_X, a Y-axis angular velocity Gyro_Y and a Z-axis angular velocity Gyro_Z of the display apparatus in a three-dimensional coordinate system; the static threshold includes an angular velocity threshold GYRO_Threshold;

determining, according to the motion information of the display apparatus and the static threshold of the display apparatus, whether the display apparatus is still or approximately still, includes: determining whether the motion information and the static threshold of the display apparatus meet:

$$\mathrm{Sqrt}(\mathrm{Gyro\_}X^2+\mathrm{Gyro\_}Y^2+\mathrm{Gyro\_}Z^2)\leq\mathrm{GYRO\_Threshold};$$

if it is determined that the n states of the display apparatus are all static states or approximately static states, determining that the display apparatus is still or approximately still; and if it is determined that the n states of the display apparatus are not all static states or approximately static states, determining that the display apparatus is in a motion state.

In some embodiments, receiving the motion information of the display apparatus, includes: receiving n pieces of motion information of the display apparatus one by one within a second preset time period, wherein n is an integer greater than or equal to 2. Determining, according to the motion information of the display apparatus and the static threshold of the display apparatus, whether the display apparatus is still or approximately still, includes: determining one by one, according to respective pieces of motion information in the n pieces of motion information and the static threshold of the display apparatus, whether respective states in n states of the display apparatus are static or approximately static; if yes, determining that the display apparatus is still or approximately still; and if no, determining that the display apparatus is in the motion state.

In another aspect, a video processing control apparatus is provided, and the video processing control apparatus includes a processor and a memory. The memory is configured to store computer program instructions that, when executed by the processor, cause the processor to perform one or more of following steps: receiving motion information of a display apparatus; determining, according to the motion information of the display apparatus and a motion threshold of the display apparatus, whether the motion state of the display apparatus affects an effect of the display apparatus using the frame rate up-conversion image processing method based on motion compensation to process a video that is to be displayed by the display apparatus; outputting a determination result; according to the determination result, outputting a first control signal that stops using the frame rate up-conversion image processing method based on motion compensation to process the video that is to be displayed by the display apparatus in a case where the motion state of the display apparatus affects the effect of the display apparatus using the frame rate up-conversion image processing method based on motion compensation to process the video that is to be displayed by the display apparatus; and outputting a second control signal that continues to use the frame rate up-conversion image processing method based on motion compensation to process the video that is to be displayed by the display apparatus in a case where the motion state of the display apparatus does not affect the effect of the display apparatus using the frame rate up-conversion image processing method based on motion compensation to process the video that is to be displayed by the display apparatus.

In some embodiments, the motion information of the display apparatus includes an X-axis acceleration Accel_X, a Y-axis acceleration Accel_Y and a Z-axis acceleration Accel_Z of the display apparatus in a three-dimensional coordinate system; the motion threshold includes an acceleration threshold Accel_Threshold.

When the computer program instructions are executed by the processor, the computer program instructions cause the processor further to perform: determining whether the motion information and the motion threshold of the display apparatus meet:

$$\mathrm{Sqrt}(\mathrm{Accel\_}X^2+\mathrm{Accel\_}Y^2+\mathrm{Accel\_}Z^2)\geq\mathrm{Accel\_Threshold};$$

if yes, determining that the motion state of the display apparatus affects the effect of the display apparatus using the frame rate up-conversion image processing method based on motion compensation to process the video that is to be displayed by the display apparatus; and if no, determining that the motion state of the display apparatus does not affect the effect of the display apparatus using the frame rate up-conversion image processing method based on motion compensation to process the video that is to be displayed by the display apparatus.

In some embodiments, when the computer program instructions are executed by the processor, the computer program instructions cause the processor further to perform: receiving m pieces of motion information of the display apparatus one by one within a first preset time period, wherein m is an integer greater than or equal to 2; determining one by one, according to respective pieces of motion information in the m pieces of motion information and the motion threshold of the display apparatus, whether respective motion states in m motion states of the display apparatus affect the effect of the display apparatus using the frame rate up-conversion image processing method based on motion compensation to process the video that is to be displayed by the display apparatus; if it is determined that the m motion states of the display apparatus all affect the effect of the display apparatus using the frame rate up-conversion image processing method based on motion compensation to process the video that is to be displayed by the display apparatus, determining that the motion state of the display apparatus affects the effect of the display apparatus using the frame rate up-conversion image processing method based on motion compensation to process the video that is to be displayed by the display apparatus; and if it is determined that the m motion states of the display apparatus do not all affect the effect of the display apparatus using the frame rate up-conversion image processing method based on motion compensation to process the video that is to be displayed by the display apparatus, determining that the motion state of the display apparatus does not affect the effect of the display apparatus using the frame rate up-conversion image processing method based on motion compensation to process the video that is to be displayed by the display apparatus.

In some embodiments, when the computer program instructions are executed by the processor, the computer program instructions cause the processor further to perform: receiving the video that is to be displayed by the display apparatus; before determining, according to the motion information and the motion threshold of the display apparatus, whether the motion state of the display apparatus affects the effect of the display apparatus using the frame rate up-conversion image processing method based on motion compensation to process the video that is to be displayed by the display apparatus, determining whether data of consecutive k frames in the data of the multiple frames are the same, wherein k is an integer greater than or equal to 2; in a case where the data of the consecutive k frames are not the same, determining, according to the motion information and the motion threshold of the display apparatus, whether the motion state of the display apparatus affects the effect of the display apparatus using the frame rate up-conversion image processing method based on motion compensation to process the video that is to be displayed by the display apparatus; and outputting the first control signal that stops using the frame rate up-conversion image processing method based on motion compensation to process the video that is to be displayed by the display apparatus in a case where the data of the consecutive k frames are the same.

In some embodiments, when the computer program instructions are executed by the processor, the computer program instructions cause the processor further to perform: in the case where the data of the consecutive k frames are not the same, determining, according to the motion information of the display apparatus and a static threshold of the display apparatus, whether the display apparatus is still or approximately still before determining, according to the motion information and the motion threshold of the display apparatus, whether the motion state of the display apparatus affects the effect of the display apparatus using the frame rate up-conversion image processing method based on motion compensation to process the video that is to be displayed by the display apparatus; in a case where the display apparatus is in a motion state, determining, according to the motion information and the motion threshold of the display apparatus, whether the motion state of the display apparatus affects the effect of the display apparatus using the frame rate up-conversion image processing method based on motion compensation to process the video that is to be displayed by the display apparatus; and outputting the first control signal that stops using the frame rate up-conversion image processing method based on motion compensation to process the video that is to be displayed by the display apparatus in a case where the display apparatus is still or relatively still.

In some embodiments, the motion information of the display apparatus includes an X-axis angular velocity Gyro_X, a Y-axis angular velocity Gyro_Y and a Z-axis angular velocity Gyro_Z of the display apparatus in a three-dimensional coordinate system; the static threshold includes an angular velocity threshold GYRO_Threshold. When the computer program instructions are executed by the processor, the computer program instructions cause the processor further to perform: determining whether the motion information and the static threshold of the display apparatus meet:

$Sqrt(Gyro\_X^2+Gyro\_Y^2+Gyro\_Z^2) \leq GYRO\_Threshold$;

if yes, determining that the display apparatus is still or approximately still; and if no, determining that the display apparatus is in a motion state.

In some embodiments, when the computer program instructions are executed by the processor, the computer program instructions cause the processor further to perform: receiving n pieces of motion information of the display apparatus one by one within a second preset time period, wherein n is an integer greater than or equal to 2; determining one by one, according to respective pieces of motion information in the n pieces of motion information and the static threshold of the display apparatus, whether respective states in n states of the display apparatus are static or approximately static; if it is determined that the n states of the display apparatus are all static states or approximately static states, determining that the display apparatus is still or approximately still; and if it is determined that the n states of the display apparatus are not all static states or approximately static states, determining that the display apparatus is in the motion state.

In yet another aspect, a display control apparatus is provided, and the display control apparatus includes a video processor and the video processing control apparatus as above. The video processor is configured to use the frame rate up-conversion image processing method based on motion compensation to process a video that is to be displayed by a display apparatus. The processor included in the video processing control apparatus is coupled to the video processor, and is configured to output a control signal to the video processor.

In yet another aspect, a display apparatus is provided. The display apparatus includes a motion sensing unit and the display control apparatus as described above, and the display control apparatus is coupled to the motion sensing unit.

In yet another aspect, a computer-readable storage medium is provided. The computer-readable storage medium has stored therein computer program instructions that, when executed by a processor, cause the processor to perform one or more steps of the video processing method as described in any of the above embodiments.

In yet another aspect, a computer program product stored in a non-transitory computer-readable storage medium is provided. The computer program product includes computer program instructions that, when run on a computer, cause the computer to perform one or more steps of the video processing method as described in any of the above embodiments.

In yet another aspect, a computer program is provided. When run on a computer, the computer program causes the computer to perform one or more steps of the video processing method as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, actual processes of a method and actual timings of signals to which the embodiments of the present disclosure relate.

DETAILED DESCRIPTION

Figure 1:
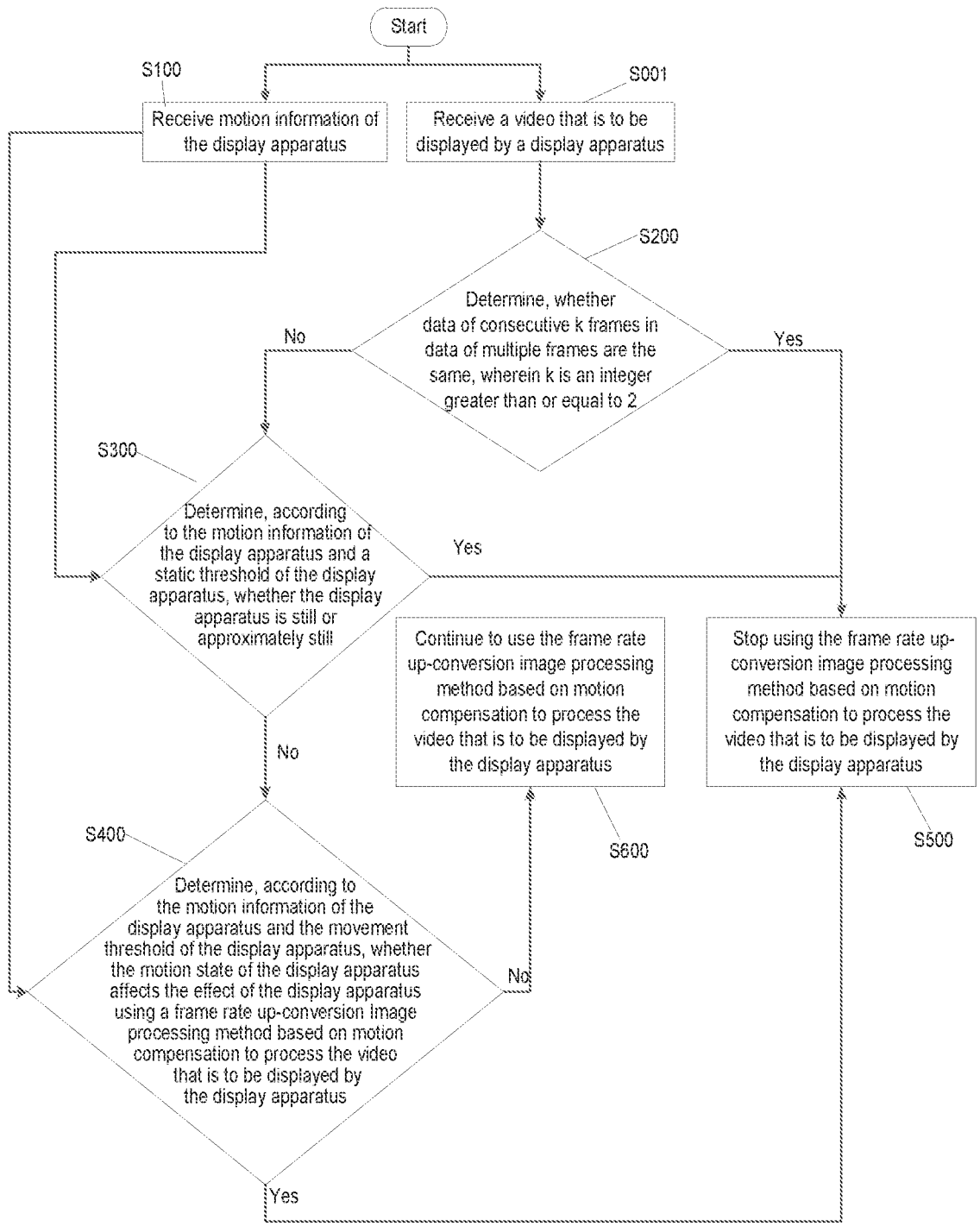
FIG. 1 is a flowchart of a video processing method, in accordance with some embodiments.

Technical solutions in some embodiments of the present disclosure will be described clearly and completely with reference to accompanying drawings. Obviously, the described embodiments are merely some but not all embodiments of the present disclosure. All other embodiments obtained according to the embodiments of the present disclosure by a person of ordinary skill in the art shall be included in the protection scope of the present disclosure.

Unless the context requires otherwise, throughout the entire description and the claims, the term "comprise" and other forms thereof such as the third-person singular form "comprises" and the present participle form "comprising" are construed as open and inclusive sense, i.e., "including, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic expressions of the above terms do not necessarily refer to the same embodiment(s) or example(s). In addition, the specific features, structures, materials or characteristics may be included in any one or more embodiments/examples in any suitable manner.

In description of some embodiments, the expressions "coupled" and "connected" and their derivatives may be used. For example, the term "connected" may be used in the description of some embodiments to indicate that two or more components are in direct physical or electrical contact with each other. In another example, the term "coupled" may be used in the description of some embodiments to indicate that two or more components are in direct physical or electrical contact. The term "coupled" or "communicatively coupled", however, may mean that two or more components are not in direct contact with each other, but yet still cooperate or interact with each other. The embodiments disclosed herein are not necessarily limited in this context.

In a virtual reality system, a user, as a participant, may experience and interact with a virtual world through a virtual reality apparatus. When the user is moving or making an action, the virtual reality apparatus also performs a corresponding motion, and a computer may perform complex calculations immediately to transmit accurate 3D world images back to generate a sense of presence. That is, a video displayed by the virtual reality apparatus is related to a motion state of the virtual reality apparatus. However, due to a problem of image delay in the virtual reality system, a video frame displayed by the virtual reality apparatus appears later than a motion state of the virtual reality apparatus at the current moment, thereby affecting quality of the displayed video. For example, a blur phenomenon may occur in the displayed video. However, due to a fact that a manner of directly increasing a screen refresh rate is limited by hardware of a display apparatus, the problem of image delay cannot be effectively solved. The existing virtual reality system uses a manner of increasing the screen refresh rate to decrease the delay of images, but an increase of the screen refresh rate is limited by rendering capability of a graphics processor, making it difficult to solve the problem of poor display quality caused by the problem of image delay.

In the related art, the virtual reality apparatus uses a frame rate up-conversion (FRUC) image processing method based on motion compensation to process video information, to improve the video blur phenomenon caused by image delay, thereby enhancing quality of the displayed video effectively.

In the FRUC image processing method based on motion compensation, a dynamic imaging system is used to insert a motion compensation frame between two conventional frames to achieve the purpose of increasing the screen refresh rate, for example, the screen refresh rate of the virtual reality apparatus is increased from 50/60 Hz to 100/120 Hz. The FRUC image processing method based on motion compensation mainly includes a motion estimation (ME) step and a motion compensation (MC) step. The motion estimation step includes estimating a motion trajectory of an object between two adjacent frames, and the motion compensation step includes obtaining information of a frame that needs to be inserted between the two adjacent frames according to information of the two adjacent frames and the motion trajectory of the object between the two adjacent frames. However, in a case where the motion trajectory of the object between two adjacent frames cannot be estimated, the FRUC image processing method based on motion compensation will fail. In this case, if the FRUC image processing method based on motion compensation is still used to process the video, not only a burden of data processing for the video processor will increase, but also the video displayed by the virtual reality apparatus shows a display defect phenomenon more serious than the video blur phenomenon due to failure of the image processing method, for example, the displayed video does not correspond to the user's actual motion state, thereby causing discomfort to human body, such as dizziness.

Since the video displayed by the virtual reality apparatus corresponds to the motion information state of the virtual reality apparatus, in a case where the motion trajectory of the object between two adjacent frames of the video that is to be displayed by the virtual reality apparatus cannot be estimated, it is indicated that a motion state of the virtual reality apparatus affects an effect of using the FRUC image processing method based on motion compensation to process video, which causes the image processing method to fail. For example, the virtual reality apparatus is a VR head-mounted display, when the user wears the VR head-mounted display in a state such as high-speed shaking, the motion trajectory of the object between two adjacent frames of the video that is to be displayed by the VR head-mounted display cannot be estimated, and the FRUC image processing method based on motion compensation fails.

Based on this, as shown in FIG. 1, some embodiments of the present disclosure provide a video processing method, which includes following steps.

In S100, motion information of a display apparatus is received. For example, the motion information of the display apparatus may be motion information of the display apparatus such as acceleration and angular velocity.

In S400, according to the motion information of the display apparatus and a motion threshold of the display apparatus, whether a motion state of the display apparatus affects an effect of the display apparatus using the FRUC image processing method based on motion compensation to process a video that is to be displayed by the display apparatus is determined. Hereinafter, a motion state that affects a processing effect of FRUC is referred to as a complex motion state, and a motion state that does not affect the processing effect of FRUC is referred to as a normal motion state.

If yes, it is indicated that the display apparatus is in the complex motion state, such as high-speed shaking. In this case, S500 is performed, that is, the process using the FRUC image processing method based on motion compensation on the video that is to be displayed by the display apparatus is stopped.

If no, it is indicated that the display apparatus is in the normal motion state, such as uniform motion. In this case, S600 is performed, that is, the process using the FRUC image processing method based on motion compensation on the video that is to be displayed by the display apparatus is continued.

In some embodiments, the motion threshold may be set according to historical statistical results and be pre-stored, and the pre-stored motion threshold is called when in use. For example, effects of the display apparatus using the FRUC image processing method based on motion compensation to process the video that is to be displayed by the display apparatus (hereinafter referred to as the video processing effects) under multiply motion states may be recorded. The motion state of the display apparatus is represented by the motion information of the display apparatus, and the video processing effect depends on whether a serious display defect phenomenon occurs in the video displayed by the display apparatus after the FRUC image processing method based on motion compensation is performed. If a serious display defect phenomenon occurs in the video displayed by the display apparatus, it is indicated that a motion state of the display apparatus at the current moment affects a processing effect of the FRUC image processing method based on motion compensation, the FRUC image processing method based on motion compensation fails, and the video processing effect is ineffective. If no serious display defect phenomenon occurs in the video displayed by the display apparatus, and the video blur phenomenon is improved, it is indicated that the motion state of the display apparatus at the current moment does not affect the processing effect of the FRUC image processing method based on motion compensation, the FRUC image processing method based on motion compensation works, and the video processing effect is effective.

For example, with a gradual increase of a complexity of motion of the display apparatus, e.g., from a gentle motion to a violent shaking, the video processing effect of each motion state is recorded to obtain a correspondence between the motion information of the display apparatus and the video processing effect. According to the correspondence, motion information of the display apparatus in a critical state where the video processing effect changes from effective to ineffective is determined and is regarded as critical motion information, and the motion threshold is determined according to the critical motion information.

It will be understood that motion thresholds corresponding to different display apparatuses are different, and for each display apparatus, an operation of setting the motion threshold should be performed in advance.

In some embodiments, the display apparatus uses a video processor disposed in the display apparatus to achieve a purpose of processing the video that is to be displayed by the display apparatus with the FRUC image processing method based on motion compensation.

In the above embodiments, for example, an implementation of stopping the process using the FRUC image processing method based on motion compensation on the video that is to be displayed by the display apparatus in S500 is that an execution apparatus of the video processing method sends a first control signal to the video processor to control the video processor to stop using the FRUC image processing method based on motion compensation to process the video that is to be displayed by the display apparatus.

For example, an implementation of continuing to use the FRUC image processing method based on motion compensation to process the video that is to be displayed by the display apparatus in S600 is that the execution apparatus of the video processing method sends a second control signal to the video processor to control the video processor to continue to use the FRUC image processing method based on motion compensation to process the video that is to be displayed by the display apparatus.

In the video processing method, according to the motion information and the motion threshold of the display apparatus, it is determined whether the motion state of the display apparatus affects the effect of the display apparatus using the FRUC image processing method based on motion compensation to process the video that is to be displayed by the display apparatus, thereby controlling whether to continue using or stop using the FRUC image processing method based on motion compensation according to the determination result. In a case where the determination result is yes, it is indicated that the display apparatus is in the complex motion state. In the complex motion state, the effect of using the FRUC image processing method based on motion compensation to process the video that is to be displayed by the display apparatus is affected, which causes the image processing method fails. In this case, the FRUC image processing method based on motion compensation is stopped being used to process the video that is to be displayed by the display apparatus, which may reduce the burden of data processing for the video processor, and avoid a more serious display defect phenomenon occurring in the video displayed by the display apparatus, which is caused by the failure of the image processing method and further causes human body discomfort. In a case where the determination result is no, it is indicated that the display apparatus is in the normal motion state. In the normal motion state, the effect of using the FRUC image processing method based on motion compensation to process the video that is to be displayed by the display apparatus is not affected. In this case, the FRUC image processing method based on motion compensation is continued to be used to process the video that is to be displayed by the display apparatus, so as to ensure that the video blur phenomenon will not occur in the video displayed by the display apparatus due to the problem of image delay, thereby improving display effect of the display apparatus.

Therefore, the video processing method provided by the embodiments of the present disclosure may improve the video blur phenomenon and ensure video quality in a case where the display apparatus is in the normal motion state, and may also reduce the burden of data processing for the video processor and avoid that a more serious display defect phenomenon occurs in the displayed video in a case where the display apparatus is in the complex operation state.

In some embodiments, the motion information of the display apparatus includes an X-axis acceleration Accel_X, a Y-axis acceleration Accel_Y and a Z-axis acceleration Accel_Z of the display apparatus in a three-dimensional coordinate system. The X-axis, the Y-axis and the Z-axis are perpendicular to each other, and the coordinate system formed by the X axis, the Y axis and the Z axis meets requirements of the world coordinate system. For example, in a case where a display surface of the display apparatus is perpendicular to a ground plane and parallel to a straight line in a direction of gravity, a straight line where the Z axis is located is parallel to the straight line in the direction of gravity, and the straight line where the Z axis is located is perpendicular to a plane formed by the X axis and the Y axis.

The motion threshold includes an acceleration threshold Acecl_Threshold. In some embodiments, the acceleration threshold Acecl_Threshold is set according to the critical motion information of the display apparatus at the moment when the video processing effect is changed from effective to ineffective, and the critical motion information of the display apparatus includes an X-axis critical acceleration Accel_X0, a Y-axis critical acceleration Accel_Y0 and a Z-axis critical acceleration Accel_Z0.

Figure 2:
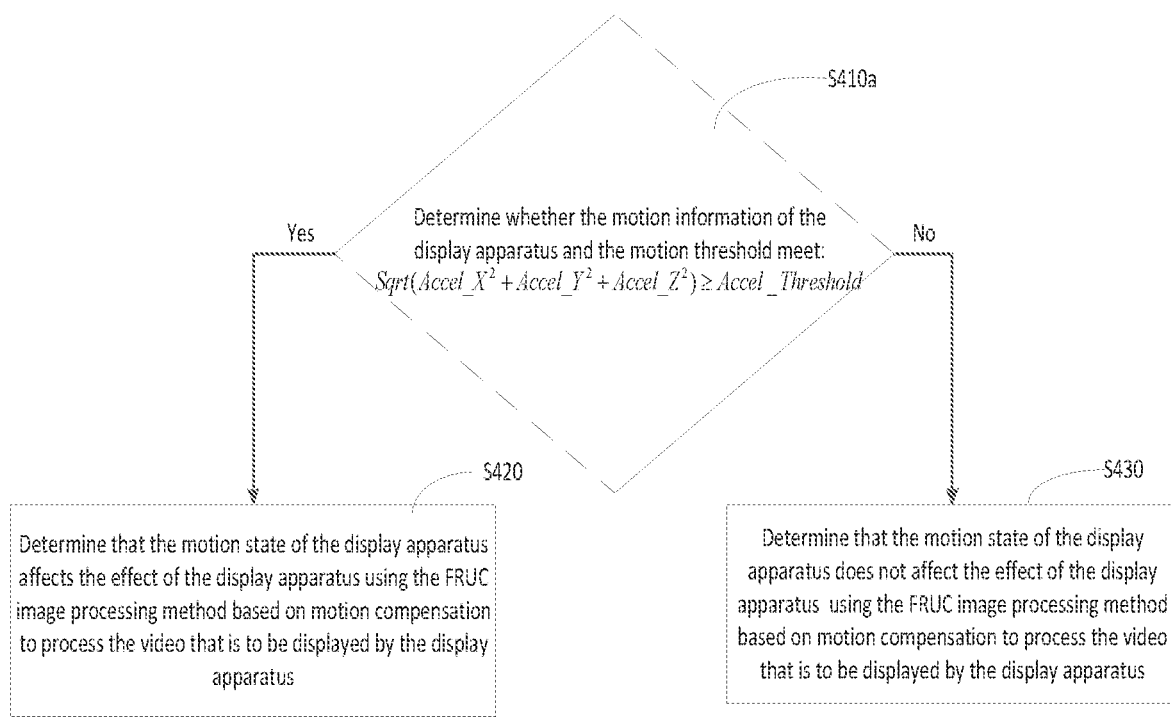
FIG. 2 is another flowchart of a video processing method, in accordance with some embodiments.

As shown in FIG. 2, S400, determining, according to the motion information of the display apparatus and the motion threshold of the display apparatus, whether the motion state of the display apparatus affects the effect of the display apparatus using the FRUC image processing method based on motion compensation to process the video that is to be displayed by the display apparatus, includes:

S410*a*, determining whether the motion information and the motion threshold of the display apparatus meet:

$$\mathrm{Sqrt}(Accel\_X^2 + Accel\_Y^2 + Accl\_Z^2) \geq Accel\_Threshold,$$

if yes, performing S420, i.e., determining that the motion state of the display apparatus affects the effect of the display apparatus using the FRUC image processing method based on motion compensation to process the video that is to be displayed by the display apparatus; and if no, performing S430, i.e., determining that the motion state of the display apparatus does not affect the effect of the display apparatus using the FRUC image processing method based on motion compensation to process the video that is to be displayed by the display apparatus.

In some embodiments, in order to avoid a state of the display apparatus being wrongly determined, the S100 of receiving the motion information of the display apparatus includes: receiving m pieces of motion information of the display apparatus one by one within a first preset time period, wherein m is an integer greater than or equal to 2.

Figure 3:
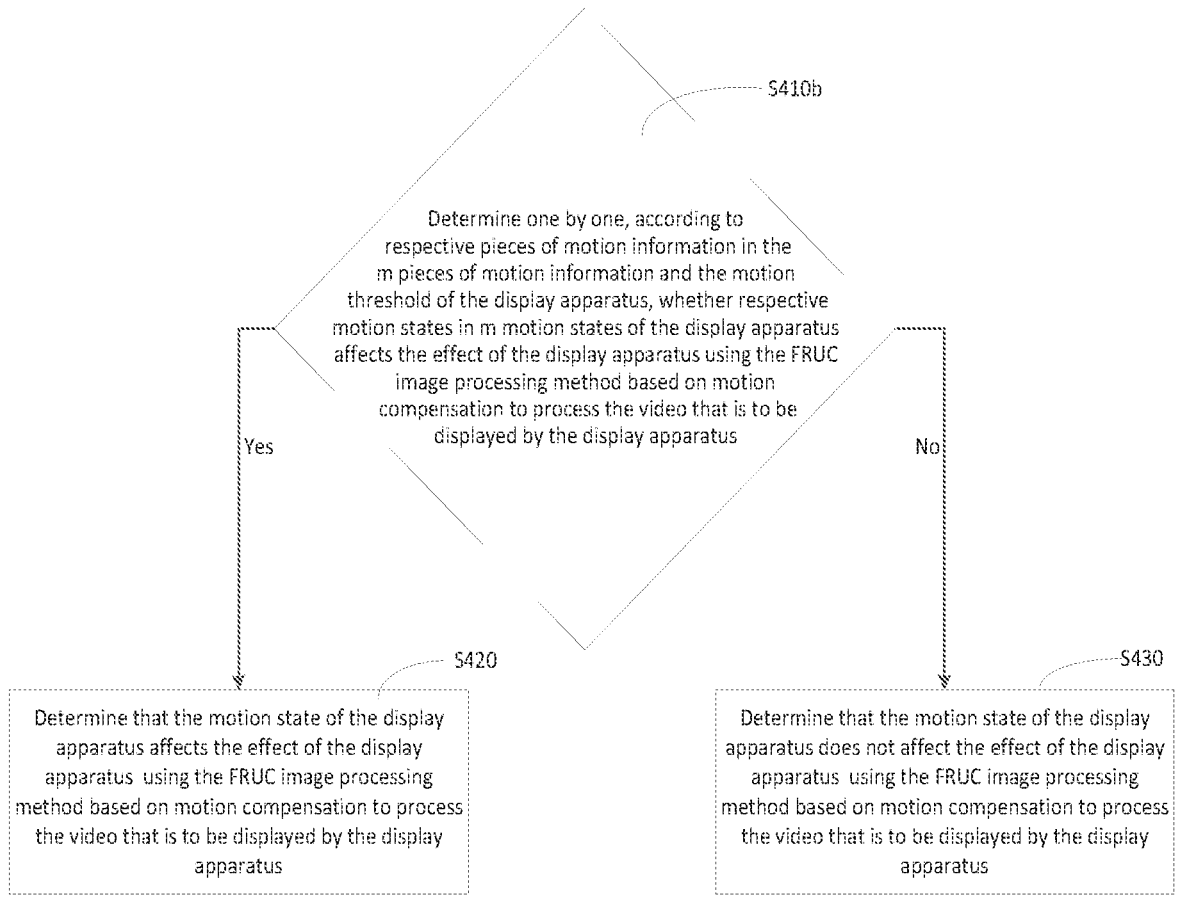
FIG. 3 is yet another flowchart of a video processing method, in accordance with some embodiments.

As shown in FIG. 3, the S400 of determining, according to the motion information of the display apparatus and the motion threshold of the display apparatus, whether the motion state of the display apparatus affects the effect of the display apparatus using the FRUC image processing method based on motion compensation to process the video that is to be displayed by the display apparatus, includes:

S410*b*, determining one by one, according to respective pieces of motion information in the m pieces of motion information and the motion threshold of the display apparatus, whether respective motion states in m motion states of the display apparatus affect the effect of the display apparatus using the FRUC image processing method based on motion compensation to process the video that is to be displayed by the display apparatus;

if yes, performing S420, i.e., determining that the motion state of the display apparatus affects the effect of the display apparatus using the FRUC image processing method based on motion compensation to process the video that is to be displayed by the display apparatus; and if no, performing S430, i.e., determining that the motion state of the display apparatus does not affect the effect of the display apparatus using the FRUC image processing method based on motion compensation to process the video that is to be displayed by the display apparatus.

In the above embodiments, within the first preset time period, the m pieces of motion information of the display apparatus are received one by one, wherein m is an integer greater than or equal to 2; and it is determined, one by one, whether all the m motion states of the display apparatus affect the effect of the display apparatus using the FRUC image processing method based on motion compensation to process the video that is to be displayed by the display apparatus. That is, by analyzing at least two motion states of the display apparatus within the first preset time period, it is more accurately determined whether the motion state of the display apparatus within the first preset time period affects the effect of the display apparatus using the FRUC image processing method based on motion compensation to process the video that is to be displayed by the display apparatus, thereby avoiding outputting an error instruction caused by the motion state of the display apparatus at a certain moment being wrongly determined, and further ensuring the accuracy of the video processing method.

In some examples, the first preset time period T1 is greater than or equal to a quotient of 2 and FPS, where FPS is a video frame rate. In this way, it may be ensured that the m pieces of motion information of the display apparatus received within the first preset time period reflect the motion state of the display apparatus during the consecutive refreshing of at least two images by the display apparatus, thereby determining more accurately whether the motion state of the display apparatus within the first preset time period affects the effect of the display apparatus using the FRUC image processing method based on motion compensation to process the video that is to be displayed by the display apparatus. As a possible design, the m pieces of motion information of the display apparatus are received one by one at a first receiving frequency within the first preset time period. The first receiving frequency is related to a refresh rate of the video displayed by the display apparatus. For example, the first receiving frequency of the motion information of the display apparatus is greater than or equal to the video frame rate, and a value of m may be determined according the first preset time period and the first receiving frequency.

In a realizable manner, the motion information of the display apparatus may be collected by a motion sensing unit, and the motion sensing unit collects the motion information of the display apparatus at a fixed collection frequency, and sends the collected motion information of the display apparatus to the execution apparatus of the video processing method one by one. In some examples, the fixed collection frequency is the same as a fixed receiving frequency. If the execution apparatus of the video processing method needs to receive the m pieces of motion information of the display apparatus one by one, the motion sensing unit continuously collects the motion information of the display apparatus for m times.

For example, in a case where the motion sensing unit collects the motion information of the display apparatus at a collection frequency of 1000 Hz, for example, the motion information of the display apparatus includes an X-axis acceleration, a Y-axis acceleration and a Z-axis acceleration, which are referred to collectively as acceleration information. The motion sensing unit collects the acceleration information of the display apparatus every millisecond, and sends the collected acceleration information of the display apparatus to the execution apparatus of the video processing method in a form of acceleration pulse of the display apparatus.

Furthermore, in a case where the implementation of stopping using the FRUC image processing method based on motion compensation to process the video that is to be displayed by the display apparatus in S500 is that the execution apparatus of the video processing method sends the first control signal to the video processor, and the implementation of continuing to use the FRUC image processing method based on motion compensation to process the video that is to be displayed by the display apparatus in S600 is that the execution apparatus of the video processing method sends the second control signal to the video processor, the first control signal and the second control signal are referred to collectively as control signals, and the second control signal is a high-level signal which may control the video processor to continue to use the FRUC image processing method based on motion compensation to process the video, and the first control signal is a low-level signal which may control the video processor to stop using the FRUC image processing method based on motion compensation to process the video.

Figure 4:
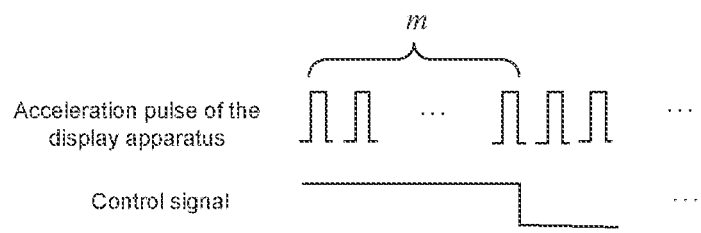
FIG. 4 is a control timing diagram of a video processing method, in accordance with some embodiments.

Based on this, as shown in FIG. 4, in a case where the video processor is controlled, according to the high-level signal, to use the FRUC image processing method based on motion compensation to process the video, if according to m pieces of acceleration information and the motion threshold of the display apparatus, it is determined that the m motion states of the display apparatus all affect the effect of the display apparatus using the FRUC image processing method based on motion compensation to process the video that is to be displayed by the display apparatus, the control signal is changed to the first control signal (the low-level signal) from the second control signal (the high-level signal), so as to utilize the low-level signal to control the video processor to stop using the FRUC image processing method based on motion compensation to process the video.

Figure 5:
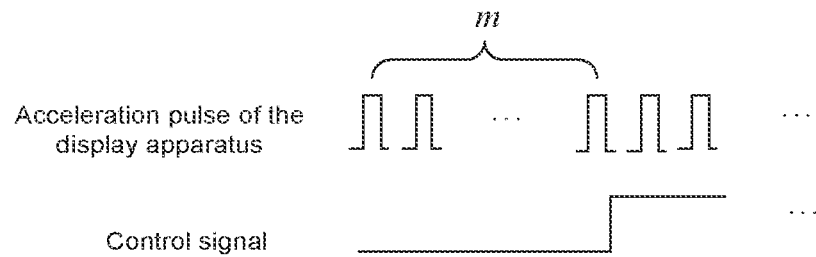
FIG. 5 is another control timing diagram of a video processing method, in accordance with some embodiments.

As shown in FIG. 5, in a case where the video processor is controlled, according to the low-level signal, to stop using the FRUC image processing method based on motion compensation to process the video, if according to the m pieces of acceleration information and the motion threshold of the display apparatus, it is determined that the m motion states of the display apparatus do not all affect the effect of the display apparatus using the FRUC image processing method based on motion compensation to process the video that is to be displayed by the display apparatus, the control signal is changed to the second control signal (the high-level signal) from the first control signal (the low-level signal), so as to utilize the high-level signal to control the video processor to use the FRUC image processing method based on motion compensation to process the video.

It will be understood that, a time period during which the motion sensing unit collects the acceleration information of the display apparatus is different from a time period during which the control signal controls whether the video processor uses the FRUC image processing method based on motion compensation to process the video that is to be displayed by the display apparatus. However, since the collection frequency of the motion sensing unit is at a millisecond level and the time is quite short, a time difference between the collection process of the acceleration information of the motion sensing unit and the control process of the control signal controlling the video processor may be ignored.

In some embodiments, as shown in FIG. 1, before it is determined, according to the motion information of the display apparatus and the motion threshold of the display apparatus, whether the motion state of the display apparatus affects the effect of the display apparatus using the FRUC image processing method based on motion compensation to process the video that is to be displayed by the display apparatus, the video processing method further includes following steps.

In S001, a video that is to be displayed by the display apparatus is received, wherein the video includes data of multiple frames.

In some examples, the S001 of receiving the video that is to be displayed by the display apparatus and the S100 of receiving the motion information of the display apparatus may be performed simultaneously. Alternatively, the video that is to be displayed by the display apparatus or the motion information of the display apparatus may also be received when it is needed to use the video information or the motion information of the display apparatus. The method is determined according to actual situations.

In S200, it is determined whether data of consecutive k frames in the data of the multiple frames are the same, wherein k is an integer greater than or equal to 2.

If yes, S500 is performed to stop using the FRUC image processing method based on motion compensation to process the video that is to be displayed by the display apparatus.

If no, S400 is performed to determine, according to the motion information of the display apparatus and the motion threshold of the display apparatus, whether the motion state of the display apparatus affects the effect of the display apparatus using the FRUC image processing method based on motion compensation to process the video that is to be displayed by the display apparatus.

In the embodiments of the present disclosure, the FRUC image processing method based on motion compensation is a method of estimating a motion trajectory of an object between two adjacent frames, and then obtaining information of a frame to be inserted between the two adjacent frames according to information of the two adjacent frames and the motion trajectory, so that the video refresh rate is increased and the video blur phenomenon is improved. Therefore, in a case where the data of consecutive k frames in the data of multiple frames are the same, it is indicated that the picture of the video at the current moment is a static picture and the consecutive k frames are not updated, and thus it is unnecessary and impossible to process the video at the current moment with the FRUC image processing method based on motion compensation.

In the embodiments as above, the video that is to be displayed by the display apparatus is received, and it is determined whether the data of consecutive k frames in the data of multiple frames are the same. In this way, in a case where the determination result is yes, it is indicated that the picture of the video at the current moment is a static picture, and it is unnecessary to process the video at the current moment with the FRUC image processing method based on motion compensation, and thus the S500 of stopping using the FRUC image processing method based on motion compensation to process the video that is to be displayed by the display apparatus is performed, which may reduce the burden of data processing for the video processor. In a case where the determination result is no, it is indicated that the picture of the video at the current moment is a dynamic picture, and it is necessary to process the video at the current moment with the FRUC image processing method based on motion compensation, and thus S400 is performed.

In a case where the display apparatus is still or approximately still, the video that is to be displayed by the display apparatus will not be affected by image delay and not cause the blur phenomenon. Based on this, as shown in FIG. 1, between S200 and S400, the video processing method provided by some embodiments of the present disclosure further includes:

S300, determining, according to the motion information of the display apparatus and a static threshold of the display apparatus, whether the display apparatus is still or approximately still.

If yes, it is indicated that the state of the display apparatus does not make the video that is to be displayed by the display apparatus be affected by the image delay and not cause the blur phenomenon. Therefore, it is unnecessary to process the video that is to be displayed by the display apparatus with the FRUC image processing method based on motion compensation, and thus S500 is performed to stop using the FRUC image processing method based on motion compensation to process the video that is to be displayed by the display apparatus.

If no, it is indicated that the state of the display apparatus is a motion state, and it is necessary to determine whether the motion state is a normal motion state or a complex motion state. The normal motion state does not affect the effect of the display apparatus using the FRUC image processing method based on motion compensation to process the video that is to be displayed by the display apparatus, and the complex motion state affects the effect of the display apparatus using the FRUC image processing method based on motion compensation to process the video that is to be displayed by the display apparatus. Based on this, S400 is performed to determine, according to the motion information of the display apparatus and the motion threshold of the display apparatus, whether the motion state of the display apparatus affects the effect of the display apparatus using the FRUC image processing method based on motion compensation to process the video that is to be displayed by the display apparatus.

It will be noted that, that the display apparatus is still or approximately still means that the display apparatus does not move at all or moves slightly within an error range of the motion information of the display apparatus received by the execution apparatus of the video processing method, and the static threshold may be set according to a motion magnitude of the display apparatus.

In an implementation, the motion information of the display apparatus includes an X-axis angular velocity Gyro_X, a Y-axis angular velocity Gyro_Y and a Z-axis angular velocity Gyro_Z of the display apparatus in a three-dimensional coordinate system, and definitions of the X-axis, Y-axis and Z-axis are referred to the previous description.

The static threshold includes an angular velocity threshold GYRO_Threshold; which may be set according to the motion magnitude of the display apparatus.

Figure 6:
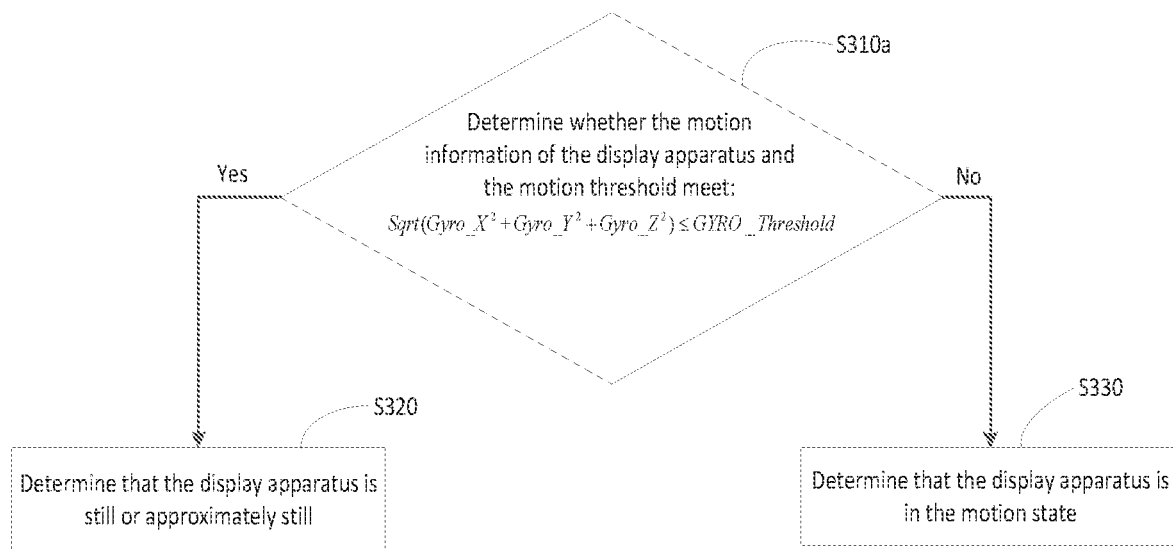
FIG. 6 is yet another flowchart of a video processing method, in accordance with some embodiments.

For example, as shown in FIG. 6, the S300 of determining whether the display apparatus is still or approximately still according to the motion information of the display apparatus and the static threshold of the display apparatus, includes:

S310a, determining whether the motion information and the motion threshold of the display apparatus meet:

$$\text{Sqrt}(Gyro\_X^2 + Gyro\_Y^2 + Gyro\_Z^2) \leq GYRO\_Threshold;$$

if yes, performing S320, i.e., determining that the display apparatus is still or approximately still; and if no, performing S330, i.e., determining that the display apparatus is in a motion state.

In some embodiments, the S100 of receiving the motion information of the display apparatus includes: receiving n pieces of motion information of the display apparatus one by one within a second preset time period T2, wherein n is an integer greater than or equal to 2, and may be set according to actual situations.

Figure 7:
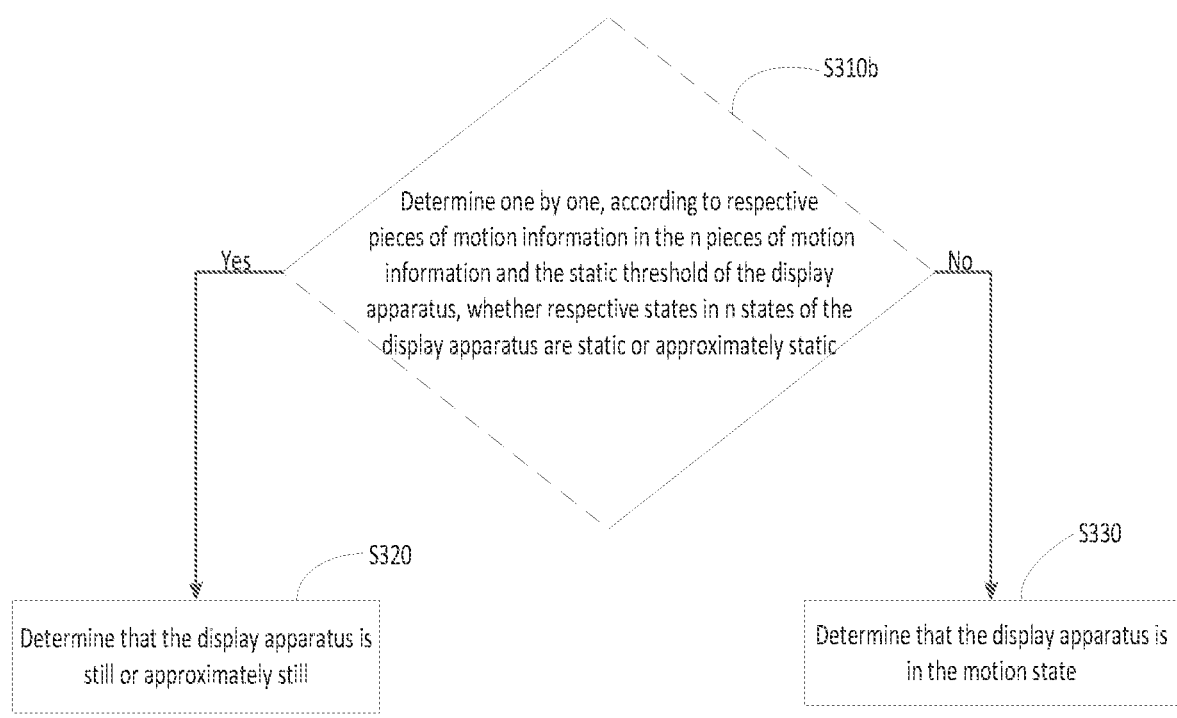
FIG. 7 is yet another flowchart of a video processing method, in accordance with some embodiments.

As shown in FIG. 7, the S300 of determining, according to the motion information the display apparatus and the static threshold of the display apparatus, whether the display apparatus is still or approximately still, includes:

S310b, determining one by one, according to respective pieces of motion information in the n pieces of motion information and the static threshold of the display apparatus, whether respective states in n states of the display apparatus are static or approximately static;

if yes, performing S320, i.e., determining that the display apparatus is still or approximately still; and if no, performing S330, i.e., determining that the display apparatus is in a motion state.

In the above embodiments, the n pieces of motion information of the display apparatus are received one by one within the second preset time period, wherein n is an integer greater than or equal to 2, and it is determined one by one whether the respective states in the n states of the display apparatus are static or approximately static. In this way, by analyzing at least two states of the display apparatus within the second preset time period, it is more accurately determined whether the display apparatus is still or approximately still within the second preset time period, thereby avoiding outputting an error instruction caused by the motion state of the display apparatus at a certain moment being wrongly determined. Further, the accuracy of the video processing method is ensured.

In some examples, the second preset time period T2 is greater than or equal to a quotient of 2 and FPS, where FPS is a video frame rate. In this way, it may be ensured that the n pieces of motion information of the display apparatus received within the second preset time period reflect a state of the display apparatus during the continuous refreshing of at least two images by the display apparatus, thereby determining more accurately whether the display apparatus is still or approximately still within the second preset time period. As a possible design, the n pieces of motion information of the display apparatus are received one by one at a second receiving frequency within the second preset time period. The second receiving frequency is related to a refresh rate of the video displayed by the display apparatus. For example, the second receiving frequency of the motion information of the display apparatus is greater than or equal to the video frame rate, and a value of n may be determined according the second preset time period and the second receiving frequency.

In a realizable manner, the motion information of the display apparatus may be collected by the motion sensing unit, and the motion sensing unit collects the motion information of the display apparatus at a fixed collection frequency, and sends the collected motion information of the display apparatus to the execution apparatus of the video processing method one by one. In some examples, the fixed collection frequency is the same as the fixed receiving frequency. If the execution apparatus of the video processing method needs to receive the n pieces of motion information of the display apparatus, the motion sensing unit collects continuously the motion information of the display apparatus for n times.

For example, in a case where the motion sensing unit collects the motion information of the display apparatus at a collection frequency of 1000 Hz, for example, the motion information of the display apparatus includes an X axis angular velocity, a Y axis angular velocity and a Z axis angular velocity, which are referred to collectively as angular velocity information. The motion sensing unit collects the angular velocity information of the display apparatus every millisecond, and sends the collected angular velocity information of the display apparatus to the execution apparatus of the video processing method in a form of angular velocity pulse of the display apparatus.

Furthermore, in a case where the implementation of stopping using the FRUC image processing method based on motion compensation to process the video that is to be displayed by the display apparatus in S500 is that the execution apparatus of the video processing method sends the first control signal to the video processor, and the implementation of continuing to use the FRUC image processing method based on motion compensation to process the video that is to be displayed by the display apparatus in S600 is that the execution apparatus of the video processing method sends the second control signal to the video processor, the first control signal and the second control signal are referred to collectively as control signals, and the second control signal is a high-level signal which may control the video processor to use the FRUC image processing method based on motion compensation to process the video; the first control signal is a low-level signal which may control the video processor to stop using the FRUC image processing method based on motion compensation to process the video.

Figure 8:
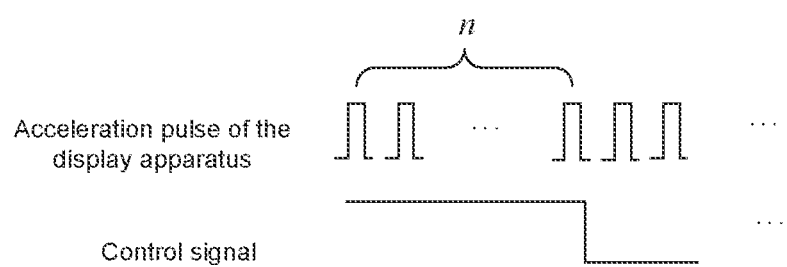
FIG. 8 is yet another control timing diagram of a video processing method, in accordance with some embodiments.

Based on this, as shown in FIG. 8, in a case where the video processor is controlled, according to the high-level signal, to use the FRUC image processing method based on motion compensation to process the video, if according to the n pieces of angular velocity information and the static threshold of the display apparatus, it is determined that the n states of the display apparatus are all static states or approximately static states, the second control signal (the high-level signal) is changed to the first control signal (the low-level signal), so as to utilize the low-level signal to control the video processor to stop using the FRUC image processing method based on motion compensation to process the video.

It will be understood that, a time period during which the motion sensing unit collects the angular velocity information of the display apparatus is different from a time period during which the control signal controls the video processor to use the FRUC image processing method based on motion compensation to process the video that is to be displayed by the display apparatus. However, since the collection frequency of the motion sensing unit is at a millisecond level and the time is quite short, a time difference between the collection process of the angular velocity information of the motion sensing unit and the control process of the control signal controlling the video processor may be ignored.

In an implementation process, steps of the video processing method may be implemented by integrated logic circuits in a processor that are hardware, or instructions in a form of software in the processor. The steps of the video processing method provided by embodiments of the present disclosure may be directly implemented by a hardware processor, or implemented by a combination of hardware and software modules in the processor. A software module may be in a random access memory, a flash memory, a read-only memory, a programmable read-only memory, an electrically erasable programmable memory, a register or other storage media as is well known in the art. The storage medium is in a memory, and the processor reads information in the memory and implements the steps of the above method in combination with hardware thereof. In order to avoid repetition, further details will not be described herein.

Figure 9:
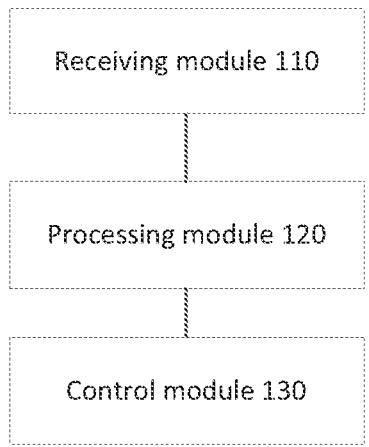
FIG. 9 is a block diagram of a video processing control apparatus, in accordance with some embodiments.

The video processing method provided by the embodiments of the present disclosure is mainly described above. As shown in FIG. 9, in some embodiments of the present disclosure, a video processing control apparatus 01 that implements the video processing method is further provided, and the video processing control apparatus 01 will be exemplarily described hereinafter.

Figure 10:
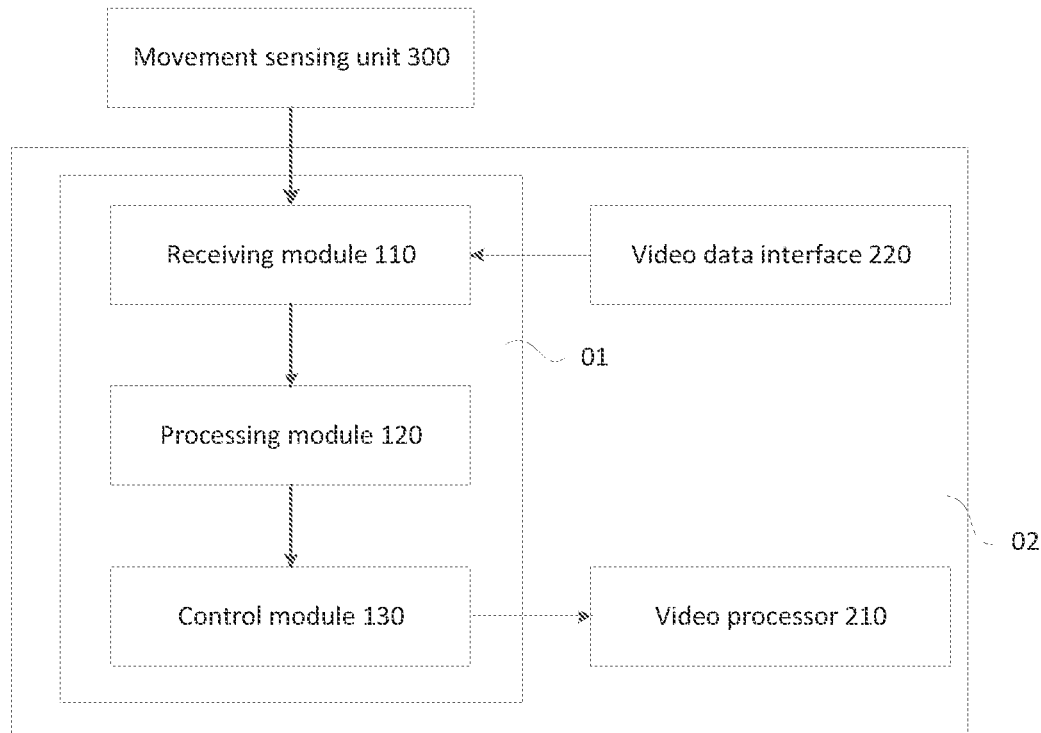
FIG. 10 is a block diagram of a display apparatus, in accordance with some embodiments.

As shown in FIGS. 1, 9 and 10, the video processing control apparatus 01 provided by some embodiments of the present disclosure includes a receiving module 110, a processing module 120 and a control module 130.

The receiving module 110 is configured to receive the motion information of the display apparatus. For example, the receiving module 110 is a transceiver.

The processing module 120 is coupled to the receiving module 110, and the processing module 120 is configured to determine, according to the motion information of the display apparatus and the motion threshold of the display apparatus, whether the motion state of the display apparatus affects the effect of the display apparatus using the FRUC image processing method based on motion compensation to process the video that is to be displayed by the display apparatus, and output a determination result.

For example, the processing module 120 is a processor, and the processor may be a central processing unit (CPU), any other general-purpose processor, a digital signal processor (DSP), an application specific integrated circuits (ASIC), a field programmable gate array (FPGA), any other programmable logic device, a discrete gate or transistor logic device, a discrete hardware component, etc. The general-purpose processor may be a microprocessor or the processor may be any conventional processor.

The control module 130 is coupled to the processing module 120, and the control module 130 is configured to: according to the determination result, output the first control signal that stops using the FRUC image processing method based on motion compensation to process the video that is to be displayed by the display apparatus in a case where the motion state of the display apparatus affects the effect of the display apparatus using the FRUC image processing method based on motion compensation to process the video that is to be displayed by the display apparatus, so as to control the video processor 210 to stop using the FRUC image processing method based on motion compensation to process the video that is to be displayed by the display apparatus; and output the second control signal that continues to use the FRUC image processing method based on motion compensation to process the video that is to be displayed by the display apparatus in a case where the motion state of the display apparatus does not affect the effect of the display apparatus using the FRUC image processing method based on motion compensation to process the video that is to be displayed by the display apparatus, so as to control the video processor 210 to continue using the FRUC image processing method based on motion compensation to process the video that is to be displayed by the display apparatus.

For example, the control module 130 is a microcontroller unit (MCU).

The video processing control apparatus 01 provided by the embodiments of the present disclosure may improve the video blur phenomenon and ensure video quality in a case where the display apparatus is in the normal motion state, and may also reduce the burden of data processing for the video processor and avoid that a more serious display defect phenomenon occurs in the displayed video in a case where the display apparatus is in the complex motion state. A specific reasoning of the beneficial effects may be referred to relevant content in the video processing method, which will not be repeated herein.

In some embodiments, as shown in FIGS. 2, 9 and 10, the motion information of the display apparatus includes the X-axis acceleration Accel_X, the Y-axis acceleration Accel_Y and the Z-axis acceleration Accel_Z in a three-dimensional coordinate system, and the motion threshold includes the acceleration threshold Acecl_Threshold.

The processing module 120 is configured to determine whether the motion information and the motion threshold of the display apparatus meet: Sqrt(Accel_$X^2$+Accel_$Y^2$+Accel_$Z^2$)≥Accel_Threshold.

If yes, it is determined that the motion state of the display apparatus affects the effect of the display apparatus using the FRUC image processing method based on motion compensation to process the video that is to be displayed by the display apparatus.

If no, it is determined that the motion state of the display apparatus does not affect the effect of the display apparatus using the FRUC image processing method based on motion compensation to process the video that is to be displayed by the display apparatus.

In some embodiments, as shown in FIGS. 3, 9 and 10, the receiving module 110 is configured to receive m pieces of motion information one by one within the first preset time period T1, wherein m is an integer greater than or equal to 2.

The processing module 120 is configured to determine one by one, according to respective pieces of motion information in the m pieces of motion information and the motion threshold of the display apparatus, whether respective motion states in m motion states of the display apparatus affect the effect of the display apparatus using the FRUC image processing method based on motion compensation to process the video that is to be displayed by the display apparatus.

If yes, it is determined that the motion state of the display apparatus affects the effect of the display apparatus using the FRUC image processing method based on motion compensation to process the video that is to be displayed by the display apparatus; if no, it is determined that the motion state of the display apparatus does not affect the effect of the display apparatus using the FRUC image processing method based on motion compensation to process the video that is to be displayed by the display apparatus.

In some embodiments, as shown in FIGS. 1, 9 and 10, the receiving module 110 is further configured to receive the video that is to be displayed by the display apparatus, and the video includes the data of multiple frames.

The processing module 120 is further configured to: before determining, according to the motion information and the motion threshold of the display apparatus, whether the motion state of the display apparatus affects the effect of the display apparatus using the FRUC image processing method based on motion compensation to process the video that is to be displayed by the display apparatus, determine whether the data of consecutive k frames in the data of the multiple frames are the same, wherein K is an integer greater than or equal to 2; and in a case where the data of the consecutive k frames are not the same, perform the step of determining, according to the motion information and the motion threshold of the display apparatus, whether the motion state of the display apparatus affects the effect of the display apparatus using the FRUC image processing method based on motion compensation to process the video that is to be displayed by the display apparatus.

The control module 130 is further configured to output the first control signal that stops using the FRUC image processing method based on motion compensation to process the video that is to be displayed by the display apparatus in a case where the data of consecutive k frames are the same, so as to control the video processor 210 to stop using the FRUC image processing method based on motion compensation to process the video.

In some embodiments, as shown in FIGS. 1, 9 and 10, the processing module 120 is further configured to: in a case where the data of consecutive k frames are not the same, before determining, according to the motion information and the motion threshold of the display apparatus, whether the motion state of the display apparatus affects the effect of the display apparatus using the FRUC image processing method based on motion compensation to process the video that is to be displayed by the display apparatus, perform a step of determining, according to the motion information of the display apparatus and the static threshold of the display apparatus, whether the display apparatus is still or approximately still; and in a case where the display apparatus is in a motion state, perform a step of determining, according to the motion information and the motion threshold of the display apparatus, whether the motion state of the display apparatus affects the effect of the display apparatus using the FRUC image processing method based on motion compensation to process the video that is to be displayed by the display apparatus.

The control module 130 is further configured to output the second control signal that continues using the FRUC image processing method based on motion compensation to process the video that is to be displayed by the display apparatus in a case where the display apparatus is still or relatively still, so as to control the video processor 210 to use the FRUC image processing method based on motion compensation to process the video.

Figure 11:
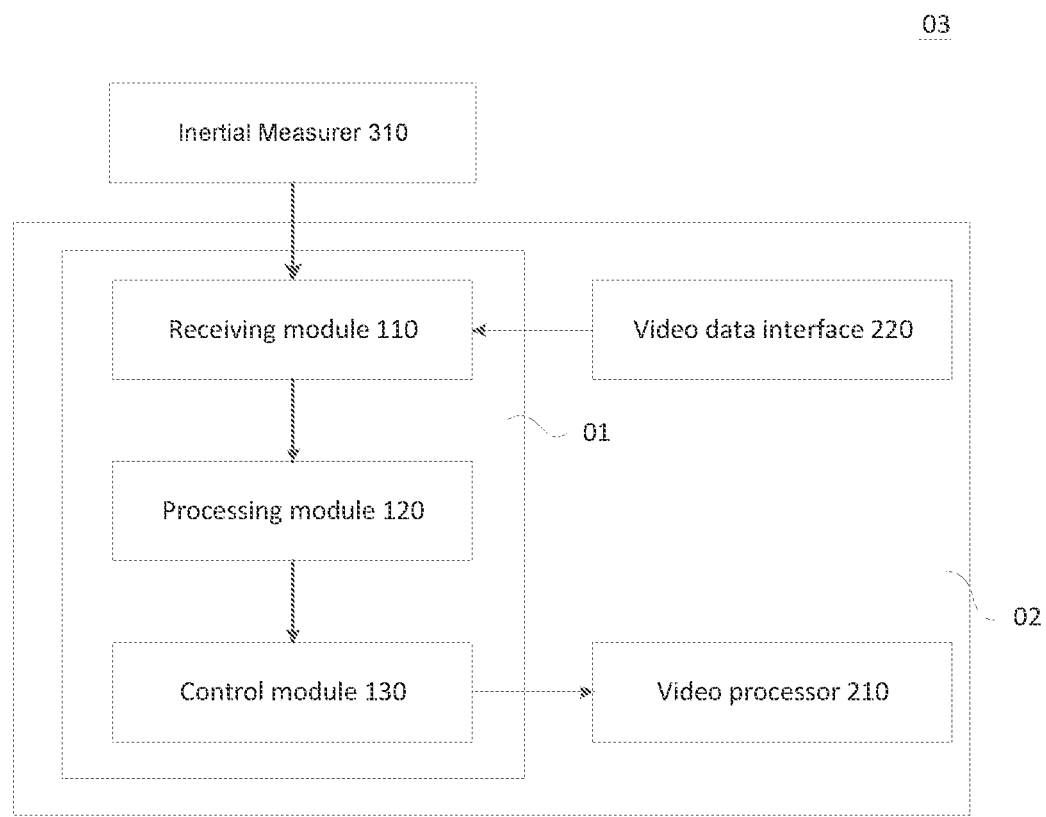
FIG. 11 is another block diagram of a display apparatus, in accordance with some embodiments.

For example, as shown in FIGS. 6, 9 and 11, the motion information of the display apparatus includes an X-axis angular velocity Gyro_X, a Y-axis angular velocity Gyro_Y and a Z-axis angular velocity Gyro_Z of the display apparatus in a three-dimensional coordinate system, and the static threshold includes the angular velocity threshold GYRO_Threshold.

The processing module 120 is configured to determine whether the motion information and the static threshold of the display apparatus meet: $\mathrm{Sqrt}(\mathrm{Gyro\_X}^2+\mathrm{Gyro\_Y}^2) \leq \mathrm{GYRO\_Threshold}$.

If yes, the processing module 120 determines that the display apparatus is still or approximately still; if no, the process module 120 determines that the display apparatus is in a motion state.

For example, as shown in FIGS. 7, 9 and 11, the receiving module 110 is configured to receive n pieces of motion information of the display apparatus one by one within the second preset time period T2, wherein n is an integer greater than or equal to 2.

The processing module 120 is configured to determine one by one, according to respective pieces of motion information in the n pieces of motion information and the static threshold of the display apparatus, whether respective states in n states of the display apparatus are static or approximately static. If yes, the processing module 120 determines that the display apparatus is still or approximately still; if no, the processing module 120 determines that the display apparatus is in a motion state.

It will be noted that, the "modules" (the receiving module, the processing module and the control module) are used to represent computer-related entities, hardware, firmware, a combination of hardware and software, software or software in execution. For example, a module may be, but is not limited to being, a process running on a processor, a processor, an object, an executable file, an execution thread, a program and/or a computer. Through illustration, both applications running on a computing apparatus and the computing apparatus may be modules.

In addition, functional modules in some embodiments of the present disclosure may be integrated in one processing unit, or each module may exist alone physically, or two or more units may be integrated in one unit. The above integrated unit may be implemented in a form of hardware or in a form of a software functional module.

As shown in FIG. 10, some embodiments of the present disclosure further provide a display control apparatus 02. The display control apparatus 02 includes a video processor 210 and the video processing control apparatus 01. The video processor 210 is configured to use the FRUC image processing method based on motion compensation to process the video that is to be displayed by the display apparatus. The video processing control apparatus 01 is configured to control whether the video processor 210 uses the FRUC image processing method based on motion compensation to process the video that is to be displayed by the display apparatus.

The control module 130 included in the video processing control apparatus 01 is coupled to the video processor 210, and outputs a control signal to the video processor 210 to control whether the video processor 210 uses the FRUC image processing method based on motion compensation to process the video.

Compared with the related art, beneficial effects of the display control apparatus 02 are the same as the beneficial effects of the video processing method, which will not be repeated herein.

In some embodiments, as shown in FIG. 10, the display control apparatus 02 further includes a video data interface 220, and the receiving module 110 included in the video processing control apparatus 01 is further coupled to the video data interface 220 for receiving video information of the display apparatus.

Figure 12:
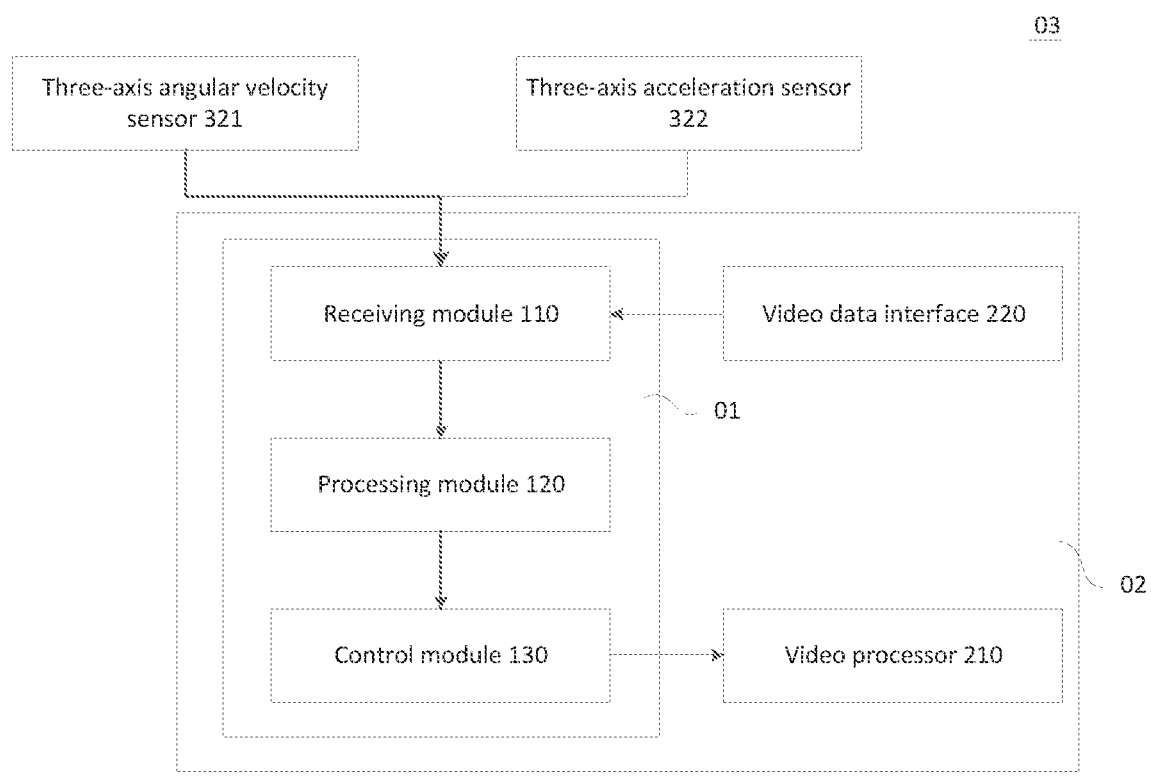
FIG. 12 is yet another block diagram of a display apparatus, in accordance with some embodiments.

As shown in FIGS. 10 to 12, some embodiments of the present disclosure further provide a display apparatus 03. The display apparatus 03 includes a motion sensing unit 300 and the display control apparatus 02, and the motion sensing unit 300 is connected to the receiving module 110 included in the video processing control apparatus 01. The motion sensing unit 300 may provide the receiving module 110 with the motion information of the display apparatus 03.

In some examples, the display apparatus 03 may be a virtual reality apparatus, an augmented reality apparatus, or the like.

The display apparatus 03 may improve the video blur phenomenon and ensure video quality in a case where the display apparatus is in the normal motion state, and may further reduce the burden of data processing for the video processor and avoid that a more serious display defect phenomenon occurs in the displayed video in a case where the display apparatus is in the complex motion state.

The motion sensing unit 300 may be provided in the body of the display apparatus 03, and a magnitude of the collection frequency at which the motion sensing unit 300 collects the motion information may be set according to actual situations. For example, the collection frequency of the motion sensing unit 300 is less than the video frame rate (FPS) to ensure that the motion information of the display apparatus may be collected at least twice within the time of one frame.

In some embodiments, as shown in FIG. 11, the motion sensing unit 300 has an integrated structure. For example, the motion sensing unit 300 is an inertial measurer 310, and the inertial measurer 310 may measure the angular velocity information and the acceleration information of the display apparatus 03. The inertial measurer 310, also known as an inertial measurement unit (IMU), is an apparatus that measures attitude angles (i.e., angular velocities) and accelerations along three axes of an object, including three single-axis accelerometers and three single-axis gyroscopes.

In some other embodiments, as shown in FIG. 12, the motion sensing unit 300 has a separated structure. For example, the motion sensing unit 300 includes a three-axis angular velocity sensor 321 and a three-axis acceleration sensor 322, and the three-axis angular velocity sensor 321 is configured to collect the angular velocity information of the display apparatus 03, and the three-axis acceleration sensor 322 is configured to collect the acceleration information of the display apparatus 03.

Some embodiments of the present disclosure further provide a computer-readable storage medium, and the computer-readable storage medium has stored therein computer program instructions that, when executed by a processor, cause the processor to perform one or more steps of the video processing method.

It will be understood by those skilled in the art that all or part of the processes of the method for implementing the above embodiments may be implemented by a computer program instructing relevant hardware, the program may be stored in the computer-readable storage medium, and when executed, the program may include the processes of embodiments of the above methods. The storage medium may be a magnetic disk, an optical disk, a read-only memory (ROM) or a random access memory (RAM), etc.

Some embodiments of the present disclosure further provide a computer program product. The computer program product includes computer program instructions, which cause a computer to perform one or more steps of the video processing method when executed on the computer.

In some embodiments, a computer program is provided. The computer program causes a computer to perform one or more steps of the video processing method when executed on the computer.

Figure 13:
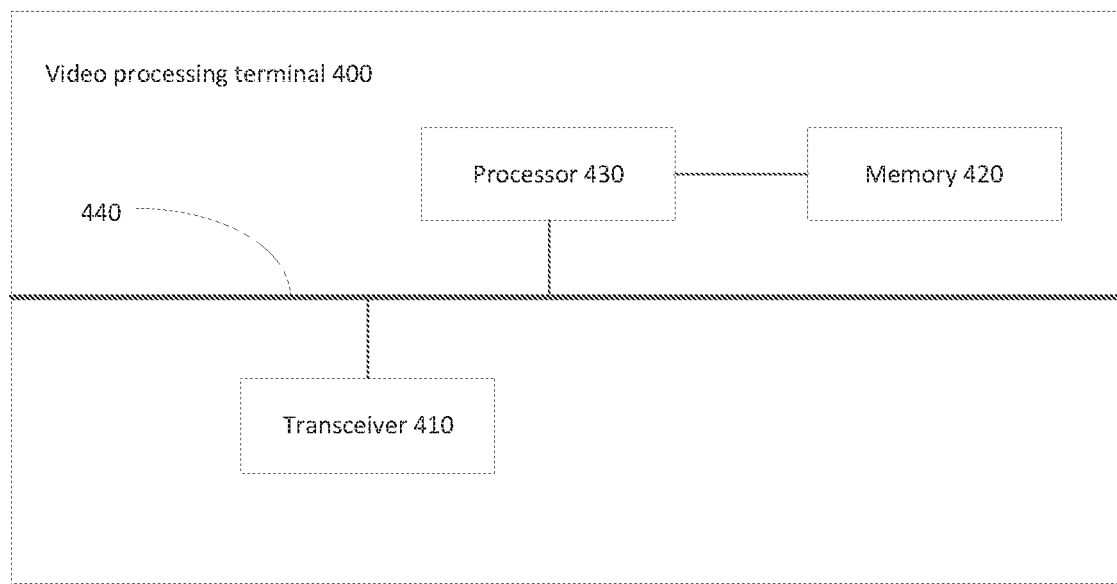
FIG. 13 is a block diagram of a video processing terminal, in accordance with some embodiments.

As shown in FIG. 13, some embodiments of the present disclosure further provide a video processing terminal 400 that includes a processor 430, a transceiver 410, a memory 420 and a bus 440. The processor 430, the transceiver 410 and the memory 420 communicate with each other through the bus 440.

The memory 420 is configured to store a plurality of instructions to implement the video processing method, and the processor 430 is configured to execute the plurality of instructions to implement the video processing method.

In some examples, the processor 430 described in some embodiments of the present disclosure may be a processor, or may be a collective term of a plurality of processing elements. For example, the processor 430 may be a central processing unit (CPU), an application specific integrated circuit (ASIC), or one or more integrated circuits configured to implement the embodiments of the present disclosure, such as one or more digital signal processors (DSP), or one or more field programmable gate arrays (FPGA).

Alternatively, the processor 430 is an advanced RISC machine (ARM) processor, an AP processor or a microcontroller unit (MCU). The ARM processor is a 32-bit design, but it is also equipped with a 16-bit instruction set, which generally saves 35% over an equivalent 32-bit code, but retains all the advantages of a 32-bit system. The AP processor is also known as a processor of a baseband chip. The microcontroller unit is also known as a single chip microcomputer or a single chip machine, in which frequency and specifications of the central process unit (CPU) are appropriately reduced, and memory, timer, universal serial bus (USB), AID conversion interface, universal asynchronous receiver transmitter (DART), programmable logic controller (PLC), direct memory access (DMA) interface and other peripheral interfaces, and even drive circuits of a liquid crystal display (LCD), are integrated into a single chip to form a chip-level computer, which may be controlled in different combinations for different applications.

The processor 420 may be a storage apparatus, or may be a collective term of a plurality of storage elements, and is used to store executable program codes. Moreover, the processor 420 may include a random access memory (RAID) or a non-volatile memory, such as a disk memory, and a flash memory.

The bus 440 may be an industry standard architecture (ISA) bus, a peripheral component interconnect (PCI) bus, or an extended industry standard architecture (EISA) bus. The bus 440 may be divided into an address bus, a data bus, a control bus, etc. For ease of illustration, only one thick line in FIG. 13 is used to represent the bus 440, however, it does not mean that there is only one bus or one type of bus.

All the embodiments in the present description are described in a progressive manner. The same or similar parts among all the embodiments are referred to each other. Each embodiment focuses on differences between the embodiment and other embodiments. In particular, as for an apparatus embodiment, since it is substantially similar to a method embodiment, descriptions thereof are relatively simple. For relevant information, reference may be made to part of descriptions of the method embodiment.

The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A video processing method, comprising:
receiving motion information of a display apparatus;
determining, according to the motion information of the display apparatus and a motion threshold of the display apparatus, whether a motion state of the display apparatus has an effect on the display apparatus using a frame rate up-conversion image processing method based on motion compensation to process a video that is to be displayed by the display apparatus;
if yes, stopping using the frame rate up-conversion image processing method based on motion compensation to process the video that is to be displayed by the display apparatus; and
if no, continuing to use the frame rate up-conversion image processing method based on motion compensation to process the video that is to be displayed by the display apparatus;
wherein receiving the motion information of the display apparatus includes receiving m pieces of motion information of the display apparatus one by one within a first preset time period, wherein m is an integer greater than or equal to 2; and
determining, according to the motion information of the display apparatus and the motion threshold of the display apparatus, whether the motion state of the display apparatus affects the effect of the display apparatus using the frame rate up-conversion image processing method based on motion compensation to process the video that is to be displayed by the display apparatus, includes:
determining one by one, according to respective pieces of motion information in the m pieces of motion information and the motion threshold of the display apparatus, whether respective motion states in m motion states of the display apparatus affect the effect of the display apparatus using the frame rate up-conversion image processing method based on motion compensation to process the video that is to be displayed by the display apparatus;
if it is determined that the m motion states of the display apparatus all affect the effect of the display apparatus using the frame rate up-conversion image processing method based on motion compensation to process the video that is to be displayed by the display apparatus, determining that the motion state of the display apparatus affects the effect of the display apparatus using the frame rate up-conversion image processing method based on motion compensation to process the video that is to be displayed by the display apparatus; and
if it is determined that the m motion states of the display apparatus do not all affect the effect of the display apparatus using the frame rate up-conversion image processing method based on motion compensation to process the video that is to be displayed by the display apparatus, determining that the motion state of the display apparatus does not affect the effect of the display apparatus using the frame rate up-conversion image processing method based on motion compensation to process the video that is to be displayed by the display apparatus.

2. The video processing method according to claim 1, wherein the motion information of the display apparatus includes an X-axis acceleration Accel_X, a Y-axis acceleration Accel_Y and a Z-axis acceleration Accel_Z of the display apparatus in a three-dimensional coordinate system; the motion threshold includes an acceleration threshold Accel_Threshold; and determining, according to the motion information of the display apparatus and the motion threshold of the display apparatus, whether the motion state of the display apparatus affects the effect of the display apparatus using the frame rate up-conversion image processing method based on motion compensation to process the video that is to be displayed by the display apparatus, includes:

determining whether the motion information and the motion threshold of the display apparatus meet:

$$\text{Sqrt}(\text{Accel}\_X^2 + \text{Accel}\_Y^2 + \text{Accel}\_Z^2) \geq \text{Accel\_Threshold};$$

if yes, determining that the motion state of the display apparatus affects the effect of the display apparatus using the frame rate up-conversion image processing method based on motion compensation to process the video that is to be displayed by the display apparatus; and if no, determining that the motion state of the display apparatus does not affect the effect of the display apparatus using the frame rate up-conversion image processing method based on motion compensation to process the video that is to be displayed by the display apparatus.

3. The video processing method according to claim 1, wherein before determining, according to the motion information of the display apparatus and the motion threshold of the display apparatus, whether the motion state of the display apparatus affects the effect of the display apparatus using the frame rate up-conversion image processing method based on motion compensation to process the video that is to be displayed by the display apparatus, the video processing method further comprises:

receiving the video that is to be displayed by the display apparatus, the video including data of multiple frames;

determining whether data of consecutive k frames in the data of the multiple frames are the same, wherein k is an integer greater than or equal to 2;

if yes, stopping using the frame rate up-conversion image processing method based on motion compensation to process the video that is to be displayed by the display apparatus; and if no, determining, according to the motion information of the display apparatus and the motion threshold of the display apparatus, whether the motion state of the display apparatus affects the effect of the display apparatus using the frame rate up-conversion image processing method based on motion compensation to process the video that is to be displayed by the display apparatus.

4. The video processing method according to claim 3, wherein if the data of the consecutive k frames are not the same, before determining, according to the motion information of the display apparatus and the motion threshold of the display apparatus, whether the motion state of the display apparatus affects the effect of the display apparatus using the frame rate up-conversion image processing method based on motion compensation to process the video that is to be displayed by the display apparatus, the video processing method further comprises:

determining, according to the motion information of the display apparatus and a static threshold of the display apparatus, whether the display apparatus is still or approximately still;

if yes, stopping using the frame rate up-conversion image processing method based on motion compensation to process the video that is to be displayed by the display apparatus; and if no, determining, according to the motion information of the display apparatus and the motion threshold of the display apparatus, whether the motion state of the display apparatus affects the effect of the display apparatus using the frame rate up-conversion image processing method based on motion compensation to process the video that is to be displayed by the display apparatus.

5. The video processing method according to claim 4, wherein the motion information of the display apparatus includes an X-axis angular velocity Gyro_X, a Y-axis angular velocity Gyro_Y and a Z-axis angular velocity Gyro_Z of the display apparatus in a three-dimensional coordinate system; the static threshold includes an angular velocity threshold GYRO_Threshold; and determining, according to the motion information of the display apparatus and the static threshold of the display apparatus, whether the display apparatus is still or approximately still, includes:

determining whether the motion information and the static threshold of the display apparatus meet:

$$\text{Sqrt}(\text{Gyro}\_X^2 + \text{Gyro}\_Y^2 + \text{Gyro}\_Z^2) \leq \text{GYRO\_Threshold};$$

if yes, determining that the display apparatus is still or approximately still; and if no, determining that the display apparatus is in a motion state.

6. The video processing method according to claim 4, wherein receiving the motion information of the display apparatus includes receiving n pieces of motion information of the display apparatus one by one within a second preset time period, wherein n is an integer greater than or equal to 2; and determining, according to the motion information of the display apparatus and the static threshold of the display apparatus, whether the display apparatus is still or approximately still, includes:

determining one by one, according to respective pieces of motion information in the n pieces of motion information and the static threshold of the display apparatus, whether respective states in n states of the display apparatus are static or approximately static;

if it is determined that the n states of the display apparatus are all static states or approximately static states, determining that the display apparatus is still or approximately still; and if it is determined that the n states of the display apparatus are not all static states or approximately static states, determining that the display apparatus is in a motion state.

7. A video processing control apparatus, comprising:
a processor; and
a memory configured to store computer program instructions that, when executed by the processor, cause the processor to perform one or more of following steps:
receiving motion information of a display apparatus;
determining, according to the motion information of the display apparatus and a motion threshold of the display apparatus, whether a motion state of the display apparatus has an effect on the display apparatus using a frame rate up-conversion image processing method based on motion compensation to process a video that is to be displayed by the display apparatus;
outputting a determination result; and
outputting, according to the determination result, a first control signal that stops using the frame rate up-conversion image processing method based on motion compensation to process the video that is to be displayed by the display apparatus in a case where the motion state of the display apparatus affects the effect of the display apparatus using the frame rate up-conversion image processing method based on motion compensation to process the video that is to be displayed by the display apparatus; and
outputting a second control signal that continues to use the frame rate up-conversion image processing method based on motion compensation to process the video that is to be displayed by the display apparatus in a case where the motion state of the display apparatus does not affect the effect of the display apparatus using the frame rate up-conversion image processing method based on motion compensation to process the video that is to be displayed by the display apparatus;
wherein when the computer program instructions are executed by the processor, the computer program instructions cause the processor further to perform:
receiving m pieces of motion information of the display apparatus one by one within a first preset time period, wherein m is an integer greater than or equal to 2;
determining one by one, according to respective pieces of motion information in the m pieces of motion information and the motion threshold of the display apparatus, whether respective motion states in m motion states of the display apparatus affect the effect of the display apparatus using the frame rate up-conversion image processing method based on motion compensation to process the video that is to be displayed by the display apparatus;
if it is determined that the m motion states of the display apparatus all affect the effect of the display apparatus using the frame rate up-conversion image processing method based on motion compensation to process the video that is to be displayed by the display apparatus, determining that the motion state of the display apparatus affects the effect of the display apparatus using the frame rate up-conversion image processing method based on motion compensation to process the video that is to be displayed by the display apparatus; and
if it is determined that the m motion states of the display apparatus do not all affect the effect of the display apparatus using the frame rate up-conversion image processing method based on motion compensation to process the video that is to be displayed by the display apparatus, determining that the motion state of the display apparatus does not affect the effect of the display apparatus using the frame rate up-conversion image processing method based on motion compensation to process the video that is to be displayed by the display apparatus.

8. The video processing control apparatus according to claim 7, wherein the motion information of the display apparatus includes an X-axis acceleration Accel_X, a Y-axis acceleration Accel_Y and a Z-axis acceleration Accel_Z of the display apparatus in a three-dimensional coordinate system; the motion threshold includes an acceleration threshold Accel_Threshold; and
when the computer program instructions are executed by the processor, the computer program instructions cause the processor further to perform:
determining whether the motion information and the motion threshold of the display apparatus meet:

$$\mathrm{Sqrt}(\mathrm{Accel\_}X^2+\mathrm{Accel\_}Y^2+\mathrm{Accel\_}Z^2)\geq \mathrm{Accel\_Threshold};$$

if yes, determining that the motion state of the display apparatus affects the effect of the display apparatus using the frame rate up-conversion image processing method based on motion compensation to process the video that is to be displayed by the display apparatus; and
if no, determining that the motion state of the display apparatus does not affect the effect of the display apparatus using the frame rate up-conversion image processing method based on motion compensation to process the video that is to be displayed by the display apparatus.

9. The video processing control apparatus according to claim 7, wherein when the computer program instructions are executed by the processor, the computer program instructions cause the processor further to perform:
receiving the video that is to be displayed by the display apparatus, and the video includes data of multiple frames;
before determining, according to the motion information and the motion threshold of the display apparatus, whether the motion state of the display apparatus affects the effect of the display apparatus using the frame rate up-conversion image processing method based on motion compensation to process the video that is to be displayed by the display apparatus, determining whether data of consecutive k frames in the data of the multiple frames are the same, wherein k is an integer greater than or equal to 2;
in a case where the data of the consecutive k frames are not the same, determining, according to the motion information and the motion threshold of the display apparatus, whether the motion state of the display apparatus affects the effect of the display apparatus using the frame rate up-conversion image processing method based on motion compensation to process the video that is to be displayed by the display apparatus; and
outputting the first control signal that stops using the frame rate up-conversion image processing method based on motion compensation to process the video that is to be displayed by the display apparatus in a case where the data of the consecutive k frames are the same.

10. The video processing control apparatus according to claim 9, wherein when the computer program instructions are executed by the processor, the computer program instructions cause the processor further to perform:

in the case where the data of the consecutive k frames are not the same, determining, according to the motion information of the display apparatus and a static threshold of the display apparatus, whether the display apparatus is still or approximately still before determining, according to the motion information and the motion threshold of the display apparatus, whether the motion state of the display apparatus affects the effect of the display apparatus using the frame rate up-conversion image processing method based on motion compensation to process the video that is to be displayed by the display apparatus;

in a case where the display apparatus is in a motion state, determining, according to the motion information and the motion threshold of the display apparatus, whether the motion state of the display apparatus affects the effect of the display apparatus using the frame rate up-conversion image processing method based on motion compensation to process the video that is to be displayed by the display apparatus; and outputting the first control signal that stops using the frame rate up-conversion image processing method based on motion compensation to process the video that is to be displayed by the display apparatus in a case where the display apparatus is still or approximately still.

11. The video processing control apparatus according to claim 10, wherein the motion information of the display apparatus includes an X-axis angular velocity Gyro_X, a Y-axis angular velocity Gyro_Y and a Z-axis angular velocity Gyro_Z of the display apparatus in a three-dimensional coordinate system; the static threshold includes an angular velocity threshold GYRO_Threshold; and when the computer program instructions are executed by the processor, the computer program instructions cause the processor further to perform:

determining whether the motion information and the static threshold of the display apparatus meet:

$Sqrt(Gyro\_X^2+Gyro\_Y^2+Gyro\_Z^2) \leq GYRO\_Threshold$;

if yes, determining that the display apparatus is still or approximately still; and if no, determining that the display apparatus is in a motion state.

12. The video processing control apparatus according to claim 10, wherein when the computer program instructions are executed by the processor, the computer program instructions cause the processor further to perform:

receiving n pieces of motion information of the display apparatus one by one within a second preset time period, wherein n is an integer greater than or equal to 2;

determining one by one, according to respective pieces of motion information in the n pieces of motion information and the static threshold of the display apparatus, whether respective states in n states of the display apparatus are static or approximately static;

if it is determined that the n states of the display apparatus are all static states or approximately static states, determining that the display apparatus is still or approximately still; and if it is determined that the n states of the display apparatus are not all static states or approximately static states, determining that the display apparatus is in a motion state.

13. A display control apparatus, comprising:

a video processor configured to use a frame rate up-conversion image processing method based on motion compensation to process a video that is to be displayed by a display apparatus; and the video processing control apparatus according to claim 7, wherein the processor included in the video processing control apparatus is coupled to the video processor and is configured to output a control signal to the video processor.

14. A display apparatus, comprising:

a motion sensing unit; and the display control apparatus according to claim 13, the display control apparatus being coupled to the motion sensing unit.

15. A non-transitory computer-readable storage medium storing computer program instructions that, when executed by a processor, cause the processor to perform one or more steps of the video processing method according to claim 1.

16. A computer program product stored in a non-transitory computer-readable storage medium, the computer program product includes computer program instructions that, when run on a computer, cause the computer to perform one or more steps of the video processing method according to claim 1.

* * * * *